US008510087B2

(12) United States Patent
Mattson et al.

(10) Patent No.: US 8,510,087 B2
(45) Date of Patent: Aug. 13, 2013

(54) VARIATIONAL MODELING WITH DISCOVERED INTERFERENCES

(75) Inventors: Howard Charles Duncan Mattson, Impington (GB); Douglas Joseph King, Peterborough (GB); Peter Phillip Lonsdale Nanson, Cambridge (GB)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 442 days.

(21) Appl. No.: 12/893,590

(22) Filed: Sep. 29, 2010

(65) Prior Publication Data

US 2012/0078582 A1 Mar. 29, 2012

(51) Int. Cl.
*G06F 9/455* (2006.01)

(52) U.S. Cl.
USPC ............................................................ 703/6

(58) Field of Classification Search
USPC ................. 703/6, 2, 7; 345/419; 382/254; 706/12; 702/188
See application file for complete search history.

(56) References Cited

U.S. PATENT DOCUMENTS

| | | | |
|---|---|---|---|
| 6,608,623 B1 * | 8/2003 | Gerlovin et al. | 345/419 |
| 6,629,065 B1 | 9/2003 | Gadh et al. | |
| 6,727,898 B2 | 4/2004 | Hariya et al. | |
| 6,963,824 B1 * | 11/2005 | Davidson et al. | 703/2 |
| 7,006,956 B1 * | 2/2006 | Gerlovin et al. | 703/6 |
| 7,042,451 B2 | 5/2006 | Venkataraman et al. | |
| 7,313,504 B2 | 12/2007 | Chin et al. | |
| 7,398,129 B2 | 7/2008 | Ishii et al. | |
| 7,492,364 B2 | 2/2009 | Devarajan et al. | |
| 2001/0043209 A1 * | 11/2001 | Nagakura | 345/419 |
| 2002/0107673 A1 | 8/2002 | Haller et al. | |
| 2005/0060130 A1 * | 3/2005 | Shapiro et al. | 703/2 |
| 2007/0091119 A1 | 4/2007 | Jezyk et al. | |
| 2007/0104383 A1 * | 5/2007 | Jojic et al. | 382/254 |
| 2008/0243439 A1 * | 10/2008 | Runkle et al. | 702/188 |
| 2009/0157572 A1 * | 6/2009 | Chidlovskii | 706/12 |

OTHER PUBLICATIONS

Jordon et al., "An introduction to variational methods for graphic models", Machine Learning, 1999.*
Welch et al., "Variational surface modeling", ACM 1992.*
Japanese Office Action dated Apr. 28, 2012 in connection with Japanese Application No. 200980122293.8; 23 pages.
Xiangping Chen et al., "On Editability of Feature-Based Design", Computer Aided Design, Elsevier Publishers BV, Barking, GB, vol. 27, No. 12, Dec. 1, 1995 10 pgs.
Kripac, J "A Mechanism for Persistently Naming Topological Entities in History-Based Parametric Solid Models" Comptr Aided Design, Elsevier Pblishrs V 29 No. 2, pp. 113-122; 1997.
Venkataraman et al., "An Investigation of Integrating Design by Features and Feature Recognition", 2000, Arizona State University, 19 pages.

* cited by examiner

*Primary Examiner* — Kandasamy Thangaveelu

(57) ABSTRACT

A system, method, and computer readable medium. A method includes receiving a geometric model in an initial state including at least a first feature and a second feature, at least one of the first and second features being a removal feature. The method includes detecting an interaction between the first and second features, and applying a dependency rule to the first feature and the second feature. The method includes performing a variational edit process including removing the first feature and the second feature according to the dependency rule. The method includes solving and recreating the edited model.

20 Claims, 7 Drawing Sheets

VARIATIONAL MODELING WITH DISCOVERED INTERFERENCES

CROSS-REFERENCE TO OTHER APPLICATIONS

The present disclosure includes some subject matter in common with commonly-assigned, concurrently-filed U.S. patent application for "Variational Modeling with Removal Features", which is hereby incorporated by reference. This application also includes some subject matter in common with U.S. patent application Ser. No. 12/422,410, filed Apr. 13, 2009, U.S. Provisional Patent Application 61/044,622, filed Apr. 14, 2008, and U.S. Provisional Patent Application 61/044,671, filed Apr. 14, 2008, each of which is hereby incorporated by reference.

TECHNICAL FIELD

The present disclosure is directed, in general, to systems and methods for use in computer-aided design, manufacturing, engineering, prototype/test, maintenance, modeling, and visualization (individually and collectively, "CAD" and "CAD systems") and in product lifecycle management ("PLM") and other systems.

BACKGROUND OF THE DISCLOSURE

Many manufactured products are first designed and modeled in CAD systems, and PLM systems are used by manufacturers, retailers, customers, and other users to manage the design, use, maintenance, and disposal of various products. Improved systems are desirable.

SUMMARY OF THE DISCLOSURE

Various embodiments include a system, method, and computer readable medium. A method includes receiving a geometric model in an initial state including at least a first feature and a second feature, at least one of the first and second features being a removal feature. The method includes detecting an interaction between the first and second features, and applying a dependency rule to the first feature and the second feature. The method includes performing a variational edit process including removing the first feature and the second feature according to the dependency rule. The method includes solving and recreating the edited model.

Another method includes receiving a geometric model in an initial state including at least a first feature and a second feature, at least one of the first and second features being a removal feature. The method includes receiving a variational edit to be performed on the geometric model and performing the variational edit process including removing the first feature. The method includes performing an interaction detection process to identify that the second feature is affected by the variational edit, and applying a dependency rule to the first feature and the second feature. The method includes rolling back the geometric model to the initial state, performing a second variational edit process including removing the first feature and the second feature according to the dependency rule, and solving and recreating the edited model.

Other embodiments include a data processing system comprising a processor and an accessible memory, where the data processing system is particularly configured to perform processes as described herein. This data processing system can be a single data processing system, or multiple data processing systems acting together. Other embodiments include a non-transitory computer-readable medium encoded with computer-executable instructions that, when executed, cause a data processing system to perform processes as described herein.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Disclosed embodiments include improved techniques for use in variational modeling processes.

CAD-type modeling systems or processes are generally classified as variational or parametric according to how they handle equation solving. Parametric systems generally require that the equations be arranged to solve for each variable in terms of other previously solved variables. In 2D and 3D parametric modeling systems, the user defines dimensions and, constraints to which the model must conform. Alterations are then automatically reflected in related areas. Strictly speaking, parametrics work in only one direction, i.e., altering entity A will affect entity B, but not vice-versa.

Variational systems can generally solve multiple constraints or other equations in any form, include 2D and 3D modeling systems in which the user defines a model by dimensions and constraints, which are then solved by a series of simultaneous equations to create and modify geometry. The changes work in both directions, i.e., changes in entity A will affect be reflected in entity B and vice-versa.

A removal feature, as used herein, is a feature in a two-dimensional or three-dimensional geometric model that must be removed prior to variational solving and then must be recreated after the variational solution has been applied into the model. Removal features that depend on other features or faces are referred to as "dependent." Typically dependence is related to physical proximity and occurs after features have been constructed one on top of the other. An "interference" refers to two overlapping sections, such as if two portions of a solid model intersect each other, such as when one feature or face touches or edits another feature or face.

When a model is edited by a user, for example by "dragging" a specific face or other feature to change a dimension, the removal features are removed from the model before the user's edit is applied. The edit is then applied and the model is solved using variational processes, and then the removal features are re-added to the edited model. Various disclosed embodiments include processes for identifying and handling dependences between removal features, interference detection, and geometric model manipulation that successfully handles these issues.

Figure 1:
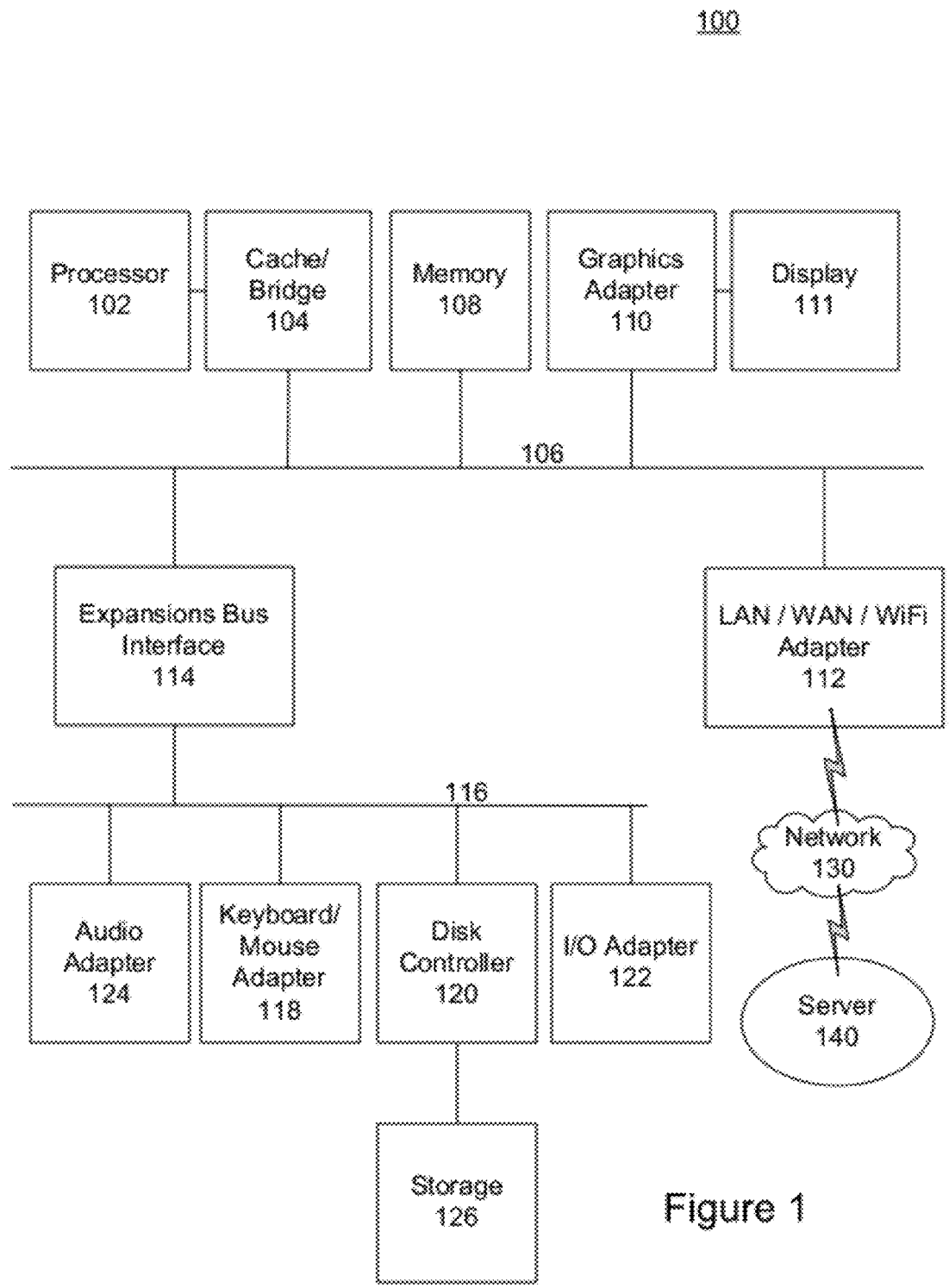
FIG. 1 depicts a block diagram of a data processing system in which an embodiment can be implemented in accordance with disclosed embodiments.

FIG. 1 depicts a block diagram of a data processing system in which an embodiment can be implemented, for example as a CAD or PLM system configured to perform processes as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Various embodiments includes systems and methods that correctly handle variational edits where initially non-interacting removal procedural features become interacting, and so may produce an interference.

FIGS. 2A-2H illustrate a variational edit with dependent removal features, properly handled.

Figure 2A:
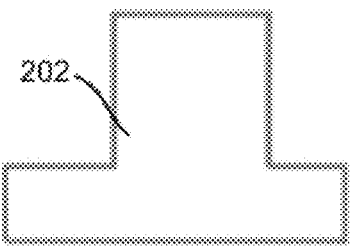
FIGS. 2A-2H illustrate a variational edit with dependent removal features, properly handled in accordance with disclosed embodiments.
Figure 2B:

FIG. 2A shows an exemplary feature type. This "Type A" feature is an additive boss 202. FIG. 2B shows a second exemplary feature type; this "Type B" feature is a subtractive hole 204. Assume these are both removal features.

Figure 2C:
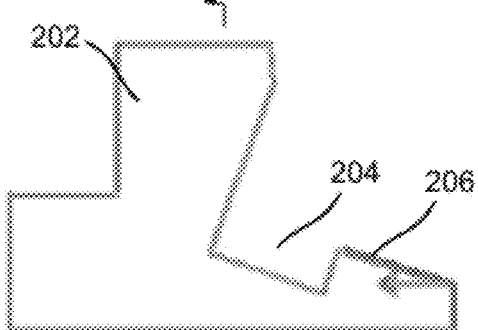

FIG. 2C shows a model 206 that includes both the additive boss 202 and the subtractive hole 204. Note that these features are interactive, and the hole is defined to come after or depend on the boss. This is because the model 206 clearly shows that the boss feature 202 was formed first on the model, then the hole feature 204 is formed in the model, subtracting both part of the base model 208 (as shown in FIG. 2E) and part of the boss to 202 to form the final model 206. In this way, the two features overlap and interact with each other, and so the dependency can be detected.

In this figure, the arrow in the bottom right indicates the variational edit intended by a user—to move the right face and the connected slanted face to the left and make the model 206 narrower.

FIGS. 2D-2H show the changes to the model made during the edit process; these changes may be but are generally not actually displayed to a user.

Figure 2D:
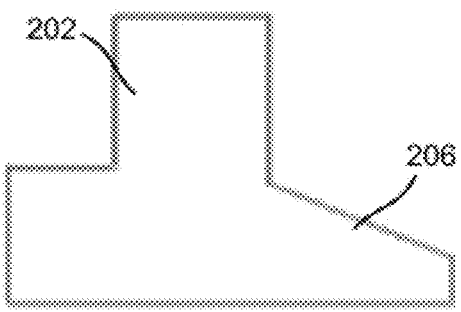
Figure 2E:
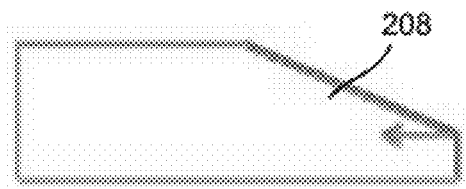

FIG. 2D shows the model 206 after hole 204 has been removed. Since hole 204 depends on boss 202, in a variational edit, the child removal feature must be removed before the parent removal feature, and when the model is recreated post-edit, the parent is added back before the child.

FIG. 2E shows the base model 208 after both hole 204 and boss 202 have been removed. Of course, the "base model" can be, and typically is, comprised of multiple features; it is referred to here as a "base model" with relation to hole 204 and boss 202.

At this point, the removal features have been removed and the variational edit can be performed, editing the right face and the connected slanted face.

Figure 2F:
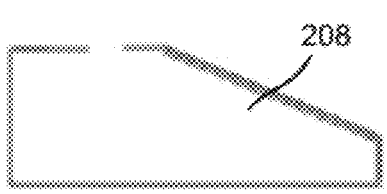

FIG. 2F shows the base model 208 after the edit and solve has been performed, before the re-creation is performed.

Figure 2G:
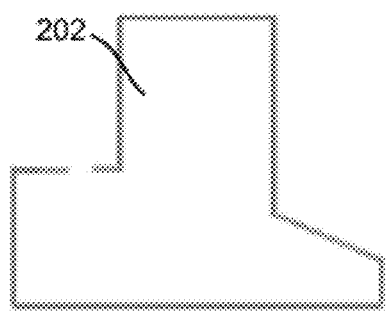
Figure 2H:
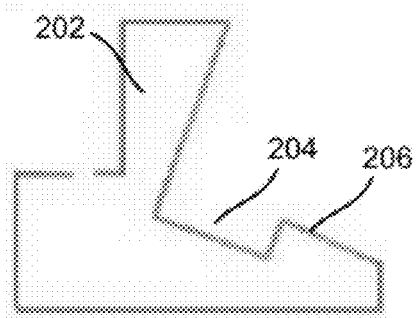

FIG. 2G shows the model 206 after edit and after the boss 202 has been re-added. FIG. 2H shows the model 206 after both boss 202 and hole 204 has been added. This is the correct result, showing that the dependencies have been handled correctly.

Removing and recreating the removal features in the wrong order may not work or may produce the wrong geometric or topological result. In a variational modeling system, when dependency of features is explicit, while interacting features are generally marked as dependent, initially non-interacting features will not be marked as dependent. In such a case, when editing such a model so as to create a newly 'discovered' interference, the system will fail to correctly sequence the update since the dependency is not known.

FIGS. 3A-3D show an example of a failure case where the dependency of non-interacting features is not recognized and produces an incorrect result.

Figure 3A:
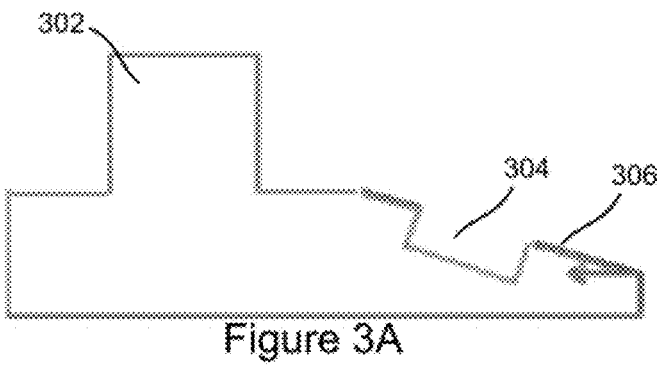
FIGS. 3A-3D show an example of a failure case where the dependency of non-interacting features is not recognized and produces an incorrect result.

FIG. 3A shows a model 306 that includes both an additive boss 302 and a subtractive hole 304, similar to FIGS. 2A-2H. Note that in this example, these features are non-interactive and do not intersect. Since this is the case, the dependency between these removal features is not recognized, and the features are not marked as dependent. In this figure, the arrow in the bottom right indicates the variational edit intended by a user—to move the right face and the connected slanted face to the left and make the model 306 narrower.

Figure 3B:
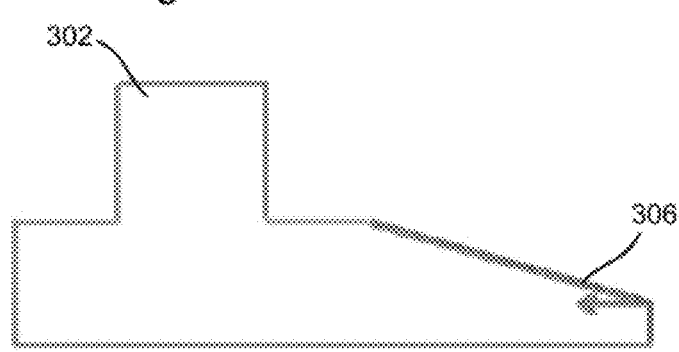

FIG. 3B shows that, because the dependency is not recognized, the system only recognizes that hole 304 must be regenerated after the variational edit, and the boss 302 is not recognized as required to be removed and regenerated. Hole 304 is removed in this figure.

Figure 3C:
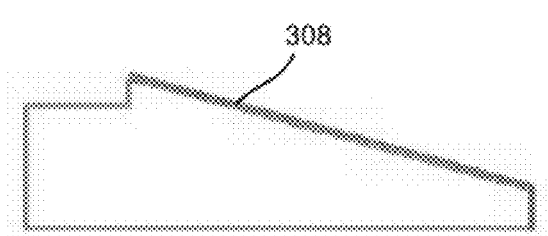

FIG. 3C shows that the variational edit is made, and because the dependency was not recognized, the face 308 "cuts off" most of boss 302.

Figure 3D:
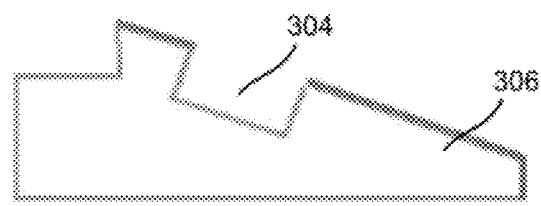

FIG. 3D shows the model 306 after re-creation and re-addition of hole 304. As can be seen, this resulting model 306 is clearly incorrect as compared to the correct model shown in FIG. 2H.

In processes according to disclosed embodiments, the system detects the new interference by tracking the feature boundary within the boundary representation (Brep) update. When any such interferences are discovered, the system will rollback the model, process the interference, and add the necessary dependence. The system them re-applies the variational solve and update, including removing the dependent removal features in reverse order and re-adding them during the re-creation.

Assignment of dependence in this case uses a heuristic priority based on typical dependencies between different feature types. Dependency rules can include such things as hole after boss, sheet metal cut-out after bend, and other frequent dependency types.

FIGS. 4A-4H illustrate a process in accordance with disclosed embodiments, using features similar to the example above.

Figure 4A:
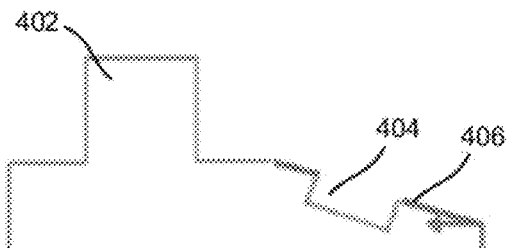
FIGS. 4A-4H illustrate a process in accordance with disclosed embodiments.

FIG. 4A shows a model 406 that includes both an additive boss 402 and a subtractive hole 404, similar to FIGS. 2A-2H. Note that in this example, these features are non-interactive and do not intersect. Since this is the case, the dependency between these removal features is not initially recognized, and the features are not initially marked as dependent. In this figure, the arrow in the bottom right indicates the variational edit intended by a user—to move the right face to the left and make the model 406 narrower.

Figure 4B:
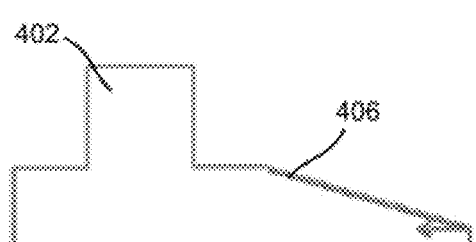

FIG. 4B shows that, because the dependency is not recognized, the system only recognizes that hole 404 must be regenerated after the variational edit, and the boss 402 is not recognizes as required to be removed and regenerated. Hole 404 is removed in this figure.

Figure 4C:
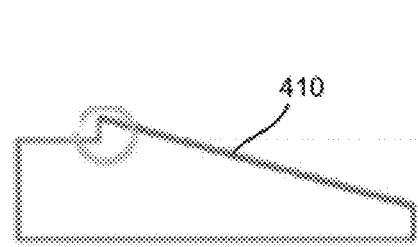

FIG. 4C shows that the variational edit is made, and because the dependency was not recognized, the face 410 "cuts off" most of boss 402.

Figure 4D:
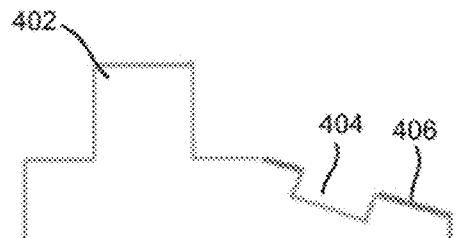

In this case, however, the system then rolls-back the model 406 and adds the dependency of hole 404 on boss 402 according to the dependency rules. FIG. 4D shows the roll-back to the original state. The operation is then re-run with the correct dependency, by first removing hole 404 then boss 402.

Figure 4E:

FIG. 4E shows the base model 408 after both hole 404 and boss 402 have been removed. Of course, as above, the "base model" can be, and typically is, comprised of multiple features; it is referred to here as a "base model" with relation to hole 404 and boss 402. At this point, the removal features have been removed and the variational edit can be re-performed, moving the right face and shortening the incident faces.

Figure 4F:
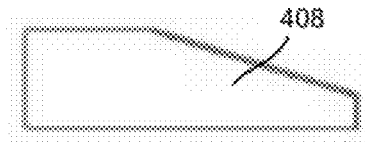

FIG. 4F shows the base model 408 after the edit and solve has been performed, before the re-creation is performed.

Figure 4G:
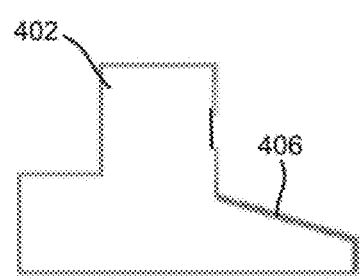
Figure 4H:
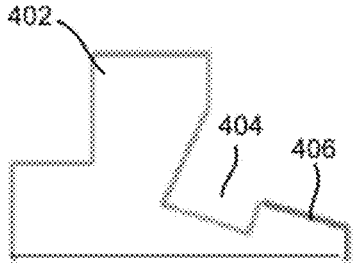

FIG. 4G shows the model 406 after edit and after the boss 402 has been re-added. FIG. 4H shows the model 406 after both boss 402 and hole 404 has been added. This is the correct result, showing that the dependencies have been handled correctly.

This is the correct "hole dominates (or depends from) boss" result.

The disclosed processes can also handle edits where the initial model state contains features that interact, but are not explicitly marked as dependent. In these cases, the interaction is discovered earlier, before the modification is attempted, and the rollback is then not needed.

Figure 5A:
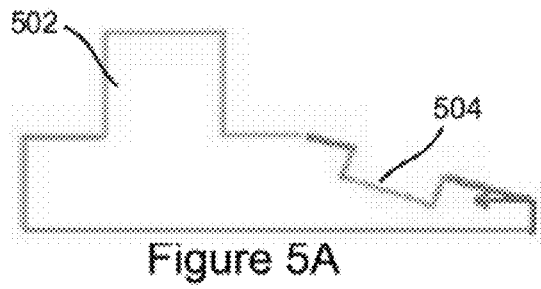
FIGS. 5A-5C illustrate differing interactions between removal features.
Figure 5B:
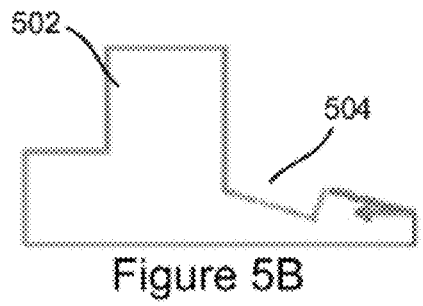
Figure 5C:
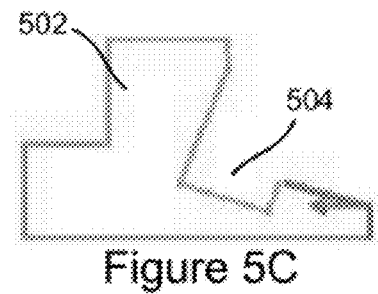

FIGS. 5A-5C illustrate differing interactions between removal features.

FIG. 5A illustrates no interaction between boss 502 and hole 504, since they do not touch or relate to each other at all.

FIG. 5B illustrates a touching interaction between boss 502 and hole 504, since the hole 504 touches but does not modify the boss 502.

FIG. 5C illustrates a substantial interaction between boss 502 and hole 504, since hole 504 modifies the boss 502.

Disclosed embodiments also address features that are dependent on the environment. In some cases a feature may be defined to dynamically depend on or come after any or some of the geometry it interacts with rather than a specific feature type. In these cases, the system handles edits where faces are moved to interact and produce the correct result. The specific handling depends on the feature semantic and may exclude certain situations or geometry as well as prescribe certain additional stipulations for dependence.

For example, a feature may derive its geometry from the surface normal where it interacts with any other faces—but only if the faces meet smoothly and not if they are designated as 'blend' faces.

Figure 6A:
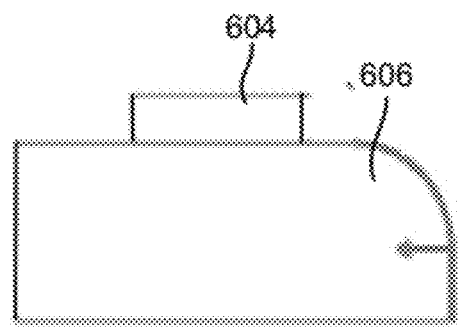
FIGS. 6A-6B illustrate a case where a variational edit is performed using a face normal for defining the geometry of a removal feature.
Figure 6B:
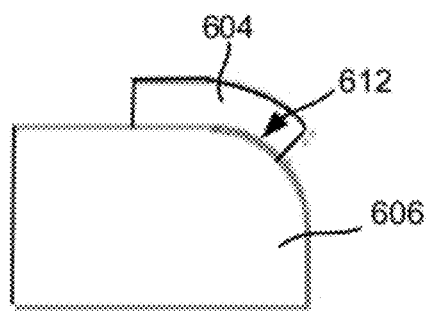

FIGS. 6A-6B illustrate a case where a variational edit is performed using a face normal for defining the geometry of a removal feature.

FIG. 6A shows a model 606 with a boss feature 604 before edit, with the intended edit shown with the arrow.

FIG. 6B shows the model 606 after the variational edit. Note that boss 604 derives its geometry from the curved face 612 that now underlies the right side of the boss 604. In this case, the right face of boss 604 derives its geometric placement from the surface normal of the curved face 612.

Disclosed embodiments discover the semantic order of feature application, whether relative to another feature or to the environment geometry. Whether the system actually needs to remove the feature and all its topology and geometry as part of an edit is secondary to properly identifying the feature. In the example of FIGS. 2A-2H, for instance, the result could also have been achieved by differently specifying local modeling options based on the semantics of discovered interaction, in alternate embodiments, instead of using non-removal features as discussed in the related application incorporated herein.

Figure 7:
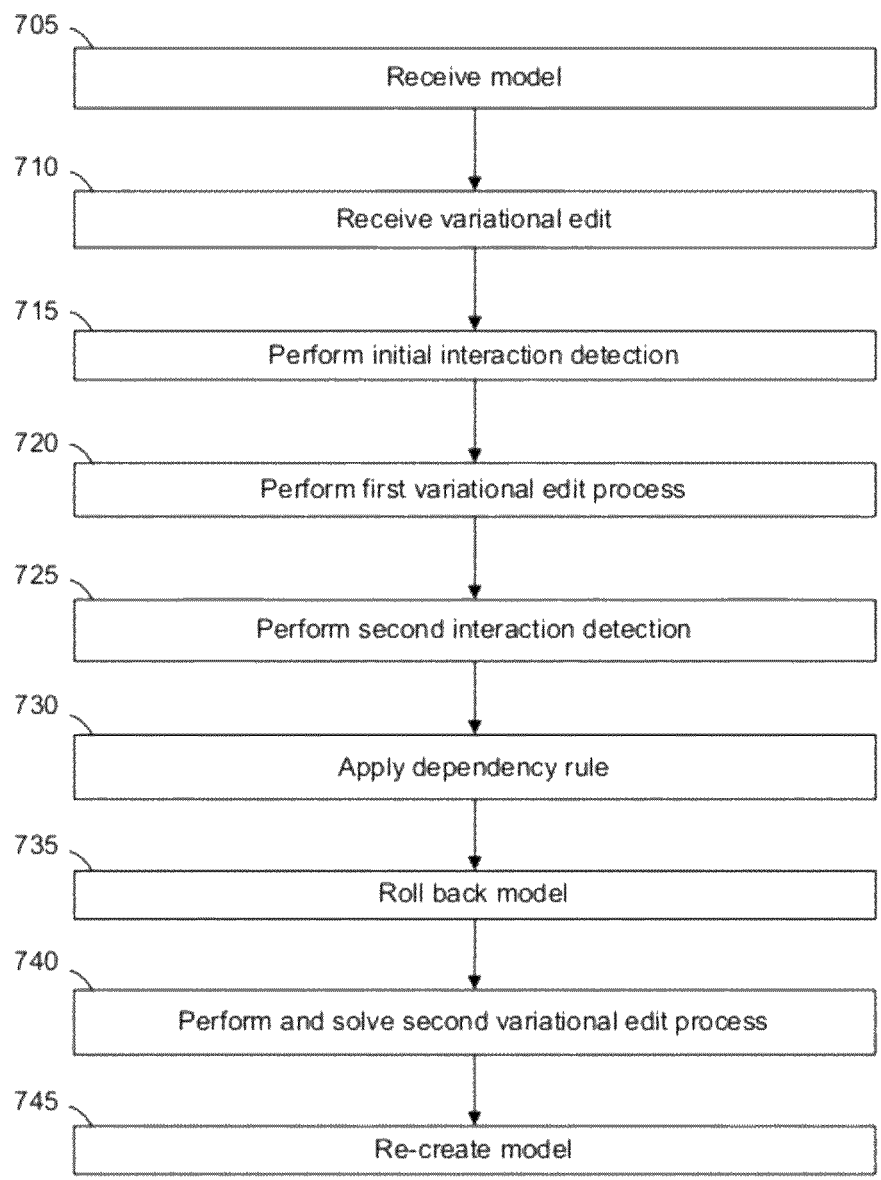
FIG. 7 depicts a flowchart of a process in accordance with disclosed embodiments.

FIG. 7 depicts a flowchart of a process in accordance with disclosed embodiments that can be implemented, for example, by a data processing system 100 configured to perform the processes described, which itself can be implemented as a CAD or PLM system.

The system receives a geometric model in an initial state (step 705). As used herein, "receiving" can include loading from storage, receiving from another system such as over a network or otherwise, receiving via an interaction with a user, or otherwise. The "system" in the processes described herein, can include one or more data processing systems, such as data processing system 100 or otherwise, that are particularly configured to perform the processes described, and can include data processing systems implemented as CAD or PLM systems. The geometric model includes at least two features, described a first and second features, that do not have a defined dependency. Each of these features can be any geometric feature, including a simple face, a feature such as a hole or boss, or otherwise. At least one of these features is a removal feature. In this example, the first feature is a removal feature, but in other cases, the second feature or both features can be removal features. "Initial state", in this case refers to the state of the model before the steps below are performed, regardless if previous edits or other manipulations of the model have been performed.

The system receives a variational edit (step 710).

The system performs an initial interaction detection process (step 715). This step detects explicit interactions such as touching interactions and substantial interactions, where the first and second features actually touch or substantially interact with each other.

The system performs a first variational edit process (step 720). This step can include identifying and removing any removal feature initially identified as affected by the variational edit. In an exemplary process, the first feature is initially identified as affected by the variational edit.

The system performs another interaction detection process to identify any other removal feature that is affected by the variational edit (step 725). In an exemplary process, the second feature is also identified as affected by the variational edit.

If other removal features were identified, such as the second feature in this example, the system applies a dependency rule according to the feature types to determine a dependency between the features (step 730). In this example, the system determines that the first feature depends on the second feature. This may be referred to herein as the first feature being the "child" of the "parent" second feature to identify the dependency roles, but this should not be confused with parent-child roles in history-based modeling. The dependency rule defines a dependency relationship between the first feature and the second feature, such as according to the type of each of the features (e.g., boss, hole, etc.).

The system rolls back the model to the initial state (step 735).

The system performs a second variational edit process (step 740) and a corresponding variational solve. This step can include removing the removal features in reverse order (i.e., child features are removed before parent features) to result in a base model in accordance with the dependency rule, performing the variational edit to the base model, and adding the removal features back to the edited model in dependency order (i.e., parent features are added before child features).

The system re-creates the model according to the variational edit and solve, including the removal features (step 745). The edited model can be stored, displayed, and/or transmitted to another system. The re-created model will be correct for all affected dependences for features that originally had a touching interaction, a substantial interaction, or no interaction.

In various embodiments, steps described may be performed sequentially, repeatedly, concurrently, in a different order, in combination, or omitted unless otherwise specifically claimed.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully-functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method implemented in one or more data processing systems, comprising:
    receiving a geometric model in an initial state including at least a first feature and a second feature, at least one of the first and second features being a removal feature;
    receiving a variational edit to be performed on the geometric model;
    performing the variational edit process including removing the first feature;
    performing an interaction detection process to identify that the second feature is affected by the variational edit;
    applying a dependency rule to the first feature and the second feature;
    rolling back the geometric model to the initial state;
    performing a second variational edit process including removing the first feature and the second feature according to the dependency rule; and
    recreating the edited model.

2. The method of claim 1, further comprising an initial interaction detection process that detects explicit interactions between any removal features of the geometric model.

3. The method of claim 1, wherein the dependency rule defines a dependency relationship between the first feature and the second feature.

4. The method of claim 1, wherein the dependency rule defines a dependency relationship according to a type of each of the features to which the rule is applied.

5. The method of claim 1, wherein the second variational edit process also includes adding the first and second features to a base model after editing the base model.

6. A method implemented in one or more data processing systems, comprising:
    receiving a geometric model in an initial state including at least a first feature and a second feature, at least one of the first and second features being a removal feature;
    detecting an interaction between the first and second features;
    applying a dependency rule to the first feature and the second feature;
    performing a variational edit process including removing the first feature and the second feature according to the dependency rule; and
    recreating the edited model.

7. The method of claim 6, wherein detecting the interaction includes detecting interactions between the first and second features and detecting features that are affected by the variational edit process.

8. The method of claim 6, wherein the dependency rule defines a dependency relationship between the first feature and the second feature.

9. The method of claim 6, wherein the dependency rule defines a dependency relationship according to a type of each of the features to which the rule is applied.

10. The method of claim 6, wherein the variational edit process also includes adding the first and second features to a base model after editing the base model.

11. A data processing system comprising:
    a processor; and
    an accessible memory, the data processing system particularly configured to:
    receive a geometric model in an initial state including at least a first feature and a second feature, at least one of the first and second features being a removal feature;
    detect an interaction between the first and second features;
    apply a dependency rule to the first feature and the second feature;
    perform a variational edit process including removing the first feature and the second feature according to the dependency rule; and
    recreating the edited model.

12. The data processing system of claim 11, wherein detecting the interaction includes detecting interactions between the first and second features and detecting features that are affected by the variational edit process.

13. The data processing system of claim 11, wherein the dependency rule defines a dependency relationship between the first feature and the second feature.

14. The data processing system of claim 11, wherein the dependency rule defines a dependency relationship according to a type of each of the features to which the rule is applied.

15. The data processing system of claim 11, wherein the variational edit process also includes adding the first and second features to a base model after editing the base model.

16. A non-transitory computer-readable medium encoded with computer-executable instructions that, when executed, cause a data processing system to perform the steps of:
    receiving a geometric model in an initial state including at least a first feature and a second feature, at least one of the first and second features being a removal feature;
    detecting an interaction between the first and second features;
    applying a dependency rule to the first feature and the second feature;
    performing a variational edit process including removing the first feature and the second feature according to the dependency rule; and
    recreating the edited model.

17. The computer-readable medium of claim 16, wherein detecting the interaction includes detecting interactions between the first and second features and detecting features that are affected by the variational edit process.

18. The computer-readable medium of claim 16, wherein the dependency rule defines a dependency relationship between the first feature and the second feature.

19. The computer-readable medium of claim 16, wherein the dependency rule defines a dependency relationship according to a type of each of the features to which the rule is applied.

20. The computer-readable medium of claim 16, wherein the variational edit process also includes adding the first and second features to a base model after editing the base model.

* * * * *